United States Patent [19]

Pakull et al.

[11] Patent Number: 5,084,550

[45] Date of Patent: Jan. 28, 1992

[54] COPOLYCARBONATE FROM MIXTURE OF POLYARYLENE DIOL

[75] Inventors: Ralf Pakull; Dieter Freitag; Volker Eckhardt; Karsten-Josef Idel, all of Krefeld; Hans R. Kricheldorf; Dierik Lübbers, both of Hamburg, all of Fed. Rep. of Germany

[73] Assignee: Bayer Aktiengesellschaft, Leverkusen, Fed. Rep. of Germany

[21] Appl. No.: 529,510

[22] Filed: May 29, 1990

[30] Foreign Application Priority Data

Jun. 10, 1989 [DE] Fed. Rep. of Germany ....... 3919046

[51] Int. Cl.$^5$ .............................................. C08G 64/06
[52] U.S. Cl. ..................... 528/204; 528/196; 528/202
[58] Field of Search ................... 528/204, 202, 196

[56] References Cited

U.S. PATENT DOCUMENTS 3,203,926  8/1965  Deanin et al. .................. 528/204
4,831,105  5/1989  Schissel ......................... 528/204

Primary Examiner—Harold D. Anderson
Attorney, Agent, or Firm—Connolly and Hutz

[57] ABSTRACT

The novel thermotropic polycarbonates having recurring structural units of the formulae

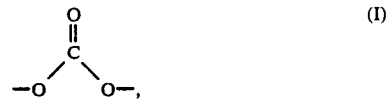

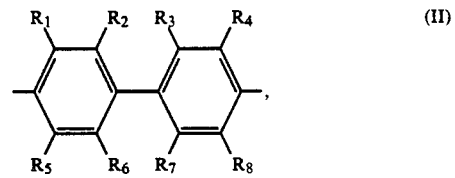

and

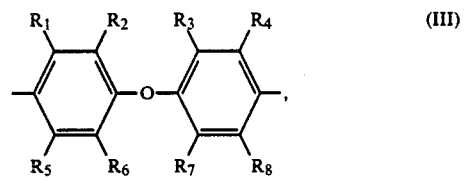

have good mechanical properties and good processability. They can be used in conventional manner for manufacturing mouldings, filaments, fibres and films.

3 Claims, No Drawings

COPOLYCARBONATE FROM MIXTURE OF POLYARYLENE DIOL

The invention relates to high molecular weight, thermotropic polycarbonates having excellent mechanical properties and good processability, a process for their preparation and their use for manufacturing mouldings, filaments, fibres and films.

Substances which form liquid crystalline melts are called "thermotropic". Thermotropic polyesters are already known. A summary of the literature is found, for example in DE-OS 3 325 787 and European EP-A 134 959, where investigation of the liquid crystalline state of the polymer melts is also described.

Polycarbonates composed of 4,4'-dihydroxydiphenyl units are known (see, for example DE-OS 1 108 433 and DE-OS 1 141 789). Surprisingly, it has now been found that polycarbonates containing at least 25 mole % of 4,4'-dihydroxydiphenyl units, relative to the sum of bisphenols, in combination with certain other bisphenols, form liquid crystalline melts.

Liquid crystalline polycarbonates based on aliphatic diols and aromatic dihydroxy compounds are already known (for example based on p,p'-bis-(ω-hydroxyalkyleneoxy)bisphenyls, p,p'-bis-(ω-hydroxyalkyleneoxy)-phenyls, 1,4-butanediol, 1,6-hexanediol or 1,8-octanediol) (M. Sato et al.; J. Polym. Sci., Polym. Chem. Edn., 26, 3077 (1988), M. Sato et al.; Makromol. Chem., Rapid Commun. 7, 231 (1986), and JP 62/212 427.

The low thermal stability of aliphatic polycarbonates is disadvantageous (H. Schnell, Chemistry and Physics of Polycarbonates, Polymer Review, Volume IX, page 27).

The object of the invention is to provide thermotropic, fully aromatic polycarbonates having recurring units of the formulae:

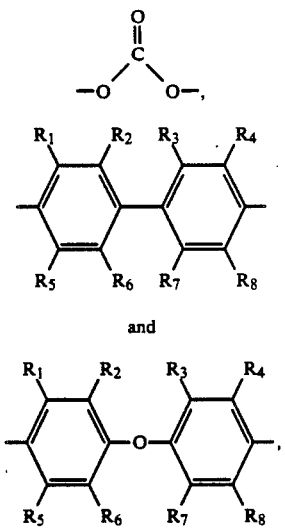

wherein
the radicals $R_1$ to $R_8$ independently of one another denote hydrogen, halogen, preferably chlorine or bromine, $C_1$–$C_8$-alkyl, preferably methyl, $C_5$–$C_6$-cycloalkyl, preferably cyclohexyl, $C_6$–$C_{10}$-aryl, preferably phenyl, or $C_7$–$C_{12}$-arylalkyl, preferably phenyl-$C_1$–$C_4$-alkyl in particular benzyl, and the molar ratio of (I):(II):(III) is 1:0.25–0.9:0.1–0.75, preferably 1:0.4–0.8:0.6–0.2, in particular 1:0.5–0.7:0.5–0.3.

Particularly preferred radicals $R_1$ to $R_8$ are: hydrogen, chlorine, bromine and methyl. Hydrogen is very particularly preferred.

Diphenols giving radicals of the formula (II) are, for example 4,4'-dihydroxydiphenyl, 3,3',5,5'-tetramethyl-4,4'-dihydroxydiphenyl, 3,3'-diphenyl-4,4'-dihydroxydiphenyl, 4,4'-dihydroxydiphenyl is preferred.

Preferred bisphenol giving radicals of the formula (III) is 4,4'-dihydroxydiphenylether.

In the thermotropic, fully aromatic polycarbonates of the invention, up to 20%, in particular 5 to 20%, of the structural units of the formula (III) can be replaced by structural units of the formulae (IV) and/or (V)

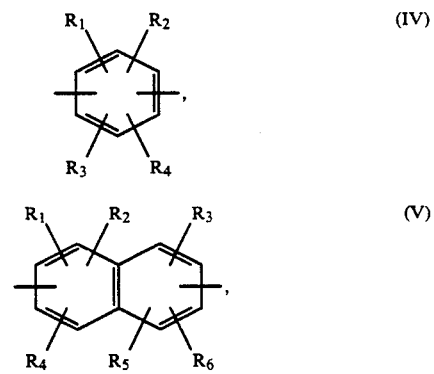

wherein the radicals $R^1$ to $R^6$ have the abovementioned meaning. The ratio of (IV):(V) is 0.9–0.1:0.1–0.9, preferably 0.8–0.2:0.2–0.8 when structural units of the formulae (IV) and (V) are also present.

Diphenols giving structural units of the formulae (IV) and (V) are, for example: hydroquinone, chlorohydroquinone, methylhydroquinone, 2,6-dihydroxynaphthalene and 1,4-dihydroxynaphthalene, preferably hydroquinone and 2,6-dihydroxynaphthalene.

The thermotropic polycarbonates of the invention can be prepared by reacting the diphenols, optionally with co-use of branching agents and/or chain terminators in the conventional amounts, for example by interfacial polymerization (see H. Schnell, Chemistry and Physics of Polycarbonates, Polymer Review, Volume IX, page 27 ff., Interscience Publishers New York, 1964).

The thermotropic polycarbonates of the invention may contain radicals originating from chain terminators as end groups. Suitable chain terminators are aromatic compounds having one functional group, such as aromatic acid halides, phenols or substituted phenols, in particular $C_1$–$C_{15}$-alkyl-substituted phenols. The chain terminators can be used in the conventional amounts which are determined according to the particular molecular weight to be set for the thermotropic liquid crystalline polycarbonates of the invention. In general, 0.5 mole % to 10.0 mole %, relative to diphenols used, are employed. Preferred chain terminators are phenol, p-tert.-butylphenol, p-chlorophenol and 2,4,6-tribromophenol.

Branching trifunctional or higher functional phenols can also be used in amounts of approximately 0.05 to 2 mole %, relative to the sum of diphenols used, such as 2,4-bis-(4-hydroxyphenylisopropyl)-phenol, 2,6-bis-(2'- hydroxy-5'-methylbenzyl)-4-methylphenol, 2-(4-hydroxyphenyl)-2-(2,4-dihydroxyphenyl)-propane and 1,4-bis-(4,4'-dihydroxytriphenylmethyl)-benzene. Trifunctional compounds are, for example 2,4-dihydroxybenzoic acid, trimesic acid, cyanuric chloride and 3,3-bis-(4-hydroxyphenyl)-2-oxo-2,3-dihydroindole and 3,3-bis-(4-hydroxy-3-methylphenyl)-2-oxo-2,3-dihydroindole.

The thermotropic liquid crystalline polycarbonates of the invention can contain the radicals (II) and (III) in random distribution, in segments or in blocks.

The melt viscosity of the thermotropic liquid crystalline polycarbonates of the invention [measured in each case above the transition temperature from the crystalline to the liquid crystalline state (usually between 200° and 350° C.) as determined by DSC] using a nozzle having a length/diameter ratio of 20 at a shear rate of $10^3 s^{-1}$] is generally in the range from 2 to 2000, preferably 5 to 1000, in particular 10 to 500, Pas.

The thermotropic liquid crystalline polycarbonates of the invention can be processed like thermoplastics to give mouldings, filaments, fibres, tapes, sheets and films, as a result of their relatively low melt viscosity. Shear forces occurring during processing attain molecular orientation which is influenced to a large degree by the strength of these forces. Furthermore, they show a pronounced structural viscosity, that is, that the melt viscosity decreases sharply when the shear forces are increased. Suitable processing methods are injection moulding, extrusion, compression moulding and melt-spinning.

Moulded parts having high tensile strength, high thermal dimensional stability and high dimensional stability can be manufactured from the thermotropic liquid crystalline polycarbonates of the invention. As the polycarbonates of the invention are exceptionally resistant to chemicals, they are suitable preferably for manufacturing:

electical articles, such as insulators, printed circuits, plug connections, fittings and surrounds for integrated circuits,
parts for interior furnishing of aircraft,
parts for appliances used in medical technology.

However, the thermotropic liquid crystalline polycarbonates of the invention can also be used as covering and coating material—in powder or dispersed form. They are particularly also suitable for manufacturing reinforced or filled moulding compounds having a reinforcement or filler content of approximately 5 to 65 wt. %, relative to reinforced or filled moulding complound.

In addition, the thermotropic polycarbonates of the invention can contain still further additives, such as polyesters, polysulphones, polyethersulphones, polyetherketones, polyphenylene sulphide and polyamides, furthermore, stabilisers, pigments, flow control agents, mould release agents-flame retardants and/or antistatic agents. These additives are added to the polycarbonates of the invention in conventional, effective amounts.

A further object of the invention is therefore the use of the novel thermotropic liquid crystalline polycarbonates for manufacturing mouldings, filaments, fibres and films.

The percentages in the following examples relate in each case to weight.

The tensile modulus of elasticity was measured in accordance with DIN 53 455.

EXAMPLE 1

The following substances were weighed into a 6 liter three-necked flask with stirrer, gas inlet and internal thermometer, with cooling to 15° C. and nitrogen flushing:

1.0 liters of water.
3.0 liters of methylene chloride.
93.1 g=0.5 mole of 4,4'-dihydroxydiphenyl.
101.1 g=0.5 mole of 4,4'-dihydroxydiphenylether.
128.0 g=3.2 moles of sodium hydroxide.

158.4 g=1.6 moles of phosgene were introduced into the mixture in the course of 60 minutes under stirring. 1.4 g=0.01 mole of ethylpiperidine were then added and the mixture was stirred for a further 45 minutes. The resulting polycarbonate was precipitated by pouring the mixture into 10 liters of methanol, and was isolated by filtration.

208.4 g of polycarbonate were obtained (94.6% of the theoretical).

A liquid crystalline phase was observed above 240° C. under a hot-stage microscope.

The relative viscosity in trifluoroacetic acid/methylene chloride (1:4, 2 g/liter, 20° C.) was 1.42.

The tensile modulus of elasticity was 3,600 MPa.

EXAMPLE 2

The following substances were weighed into a 1 liter three-necked flask with stirrer, gas inlet and internal thermometer, with cooling to 15° C. and nitrogen flushing:

0.1 liter of water.
0.3 liter of methylene chloride.
3.7 g=0.02 mole of 4,4'-dihydroxydiphenyl.
12.1 g=0.06 mole of 4,4'-dihydroxydiphenylether.
10.2 g=0.26 mole of sodium hydroxide.

12.7 g=0.13 mole of phosgene were introduced into the mixture in the course of 60 minutes under stirring. 0.1 g=0.001 mole of ethylpiperidine was then added and the mixture was stirred for a further 45 minutes. The resulting polycarbonate was precipitated by pouring the mixture into 2 liters of methanol, and isolated by filtration.

9.1 g of polycarbonate were obtained (52.5% of the theoretical).

A liquid crystalline phase was observed above 220° C. under a hot-stage microscope.

We claim:

1. Thermotropic, fully aromatic polycarbonate having recurring units of the formulae

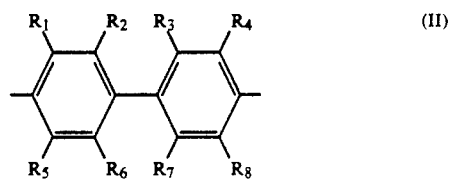

and

-continued

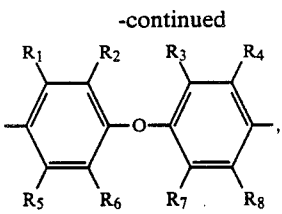

(III)

wherein
the radicals $R_1$ to $R_8$ independently of one another denote hydrogen, halogen $C_1$–$C_8$-alkyl, $C_5$–$C_6$-cycloalkyl, $C_6$–$C_{10}$-aryl or $C_7$–$C_{12}$-arylalkyl,
and the molar ratio of (I):(II):(III) is 1:0.25–0.9:0.1–0.75.

2. Thermotropic, fully aromatic polycarbonate according to claim 1 wherein 5 to 20% of the structural unit (III) are replaced by structural units of the formulae (IV), (V), or a mixture thereof

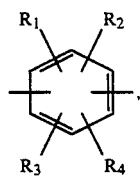

(IV)

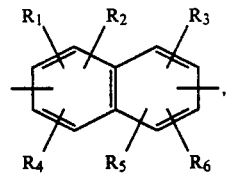

(V)

wherein,
the radicals $R_1$–$R_6$ independently of one another denote hydrogen, halogen, $C_1$–$C_8$-alkyl, $C_5$–$C_6$-cycloalkyl, $C_6$–$C_{10}$-aryl or $C_7$–$C_{12}$-arylalkyl.

3. A molding, filament, fiber or film comprising the polycarbonate of claim 1.

* * * * *